United States Patent
Krämer

(10) Patent No.: US 6,367,364 B1
(45) Date of Patent: Apr. 9, 2002

(54) POWER ASSISTED BRAKE FOR MOTOR VEHICLES

(75) Inventor: Horst Krämer, Ginsheim-Gustavsburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/622,003

(22) PCT Filed: Feb. 9, 1999

(86) PCT No.: PCT/EP99/00827

§ 371 Date: Sep. 26, 2000

§ 102(e) Date: Sep. 26, 2000

(87) PCT Pub. No.: WO99/41123

PCT Pub. Date: Aug. 19, 1999

(30) Foreign Application Priority Data

Feb. 13, 1998 (DE) .......................... 198 05 841

(51) Int. Cl.⁷ .................................. F15B 9/12
(52) U.S. Cl. ...................................... 91/376 R
(58) Field of Search ............................ 91/376 R, 369.1, 91/369.3

(56) References Cited

U.S. PATENT DOCUMENTS

| | | | | |
|---|---|---|---|---|
| 5,263,399 A | * | 11/1993 | Flory et al. ............. | 91/376 R |
| 5,493,949 A | * | 2/1996 | Castel et al. ............ | 91/376 R |
| 5,878,577 A | * | 3/1999 | Levrai et al. ............ | 60/579 |

FOREIGN PATENT DOCUMENTS

| | | |
|---|---|---|
| DE | 34 45 118 | 6/1986 |
| DE | 39 15 219 | 11/1990 |
| DE | 42 27 879 | 2/1994 |
| DE | 44 18 270 | 11/1995 |
| DE | 44 41 149 | 5/1996 |
| DE | 196 01 113 | 7/1997 |
| DE | 196 17 589 | 11/1997 |
| GB | 2 299 384 | 10/1996 |
| WO | 94 04403 | 3/1994 |
| WO | 96 41738 | 12/1996 |

* cited by examiner

Primary Examiner—Edward K. Look
Assistant Examiner—Igor Kershteyn
(74) Attorney, Agent, or Firm—Rader, Fishman & Grauer PLLC

(57) ABSTRACT

The present invention relates to a brake force booster for automotive vehicles with a booster housing having its interior space subdivided by a movable wall into a vacuum chamber and a working chamber, and with a control valve which controls a pressure differential that acts upon the movable wall and is accommodated in a control housing that carries the movable wall, the said control valve being comprised of at least two concentrically arranged sealing seats and a valve member which defines in the control housing a pneumatic chamber that can be acted upon by the pneumatic pressure that prevails in the working chamber wherein the valve member includes at least two sealing lips of different diameters which define the pneumatic chamber in the control housing, and that the effective pneumatic surface of the chamber which is influenced by the difference in diameters is generally in conformity with the pneumatic surface defined between the two sealing seats.

7 Claims, 2 Drawing Sheets

POWER ASSISTED BRAKE FOR MOTOR VEHICLES

TECHNICAL FIELD

The present invention generally relates to vehicle brake systems and more particularly relates to a brake force booster for automotive vehicles.

BACKGROUND OF THE INVENTION

A brake force booster of this type is generally disclosed in EP 655 039. The valve member of this brake force booster defines in the control housing a pneumatic chamber which is adapted to be acted upon by the pneumatic pressure that prevails in the working chamber. For this purpose, a pneumatic channel is provided between the pneumatic chamber and the working chamber in the area of a sealing surface of the valve member.

The prior art brake force booster has principally a satisfactory operational performance because the pneumatic chamber permits achieving a reduction of the difference between the reaction force of the brake force booster and the resetting force acting on the valve piston so that an increase of the resetting force is possible with the reaction force remaining constant, or a reduction of the reaction force is possible with the resetting force remaining constant. This improves the hysteresis of the brake force booster of the present invention.

However, the principally positive operational performance of the brake force booster does not cover all operating conditions. For example, with the brake force booster having reached its maximum attainable boosting effect, the valve member tends to remain in this maximum boosting effect condition because the resulting force which is applied to the valve member due to the pneumatic chamber, assists in the separation of the vacuum channel so that the valve member continues to be urged in the direction of the sealing seat. Consequently, the valve member is not pressure-balanced to full extent in all operating conditions.

Therefore, an object of the present invention is to provide a brake force booster with an ideally pressure-balanced valve member which takes into account the cost reductions demands in the automotive supplier industry, hence, in particular permitting ease of manufacture and assembly of the individual parts, and effectively utilizing the limited mounting space.

This object is achieved by the present invention wherein the valve member includes at least two sealing lips of different diameters which define the pneumatic chamber in the control housing, and the effective pneumatic surface of the chamber which is influenced by the difference in diameters is generally in conformity with the pneumatic surface defined between the two sealing seats.

A complete pressure balance of the control valve is achieved with these features in a simple way of manufacture, without requiring complicated constructions with difficult assembly operations.

It is favorable that the sealing lips largely align with the sealing seats in an axial direction. This effects a space-saving construction in a radial direction and a small deviation of the air flows during ventilation or evacuation, which permits a good and quick response behavior of the brake force booster.

According to the preferred embodiment, a guide element with two concentric guiding sockets is associated with the valve member with the sealing lips. Each of the sealing lips acts resiliently on a contact surface of a socket. The advantage achieved by this measure is that the valve member is guided exclusively on a component in an axial direction, other than in the state of the art where it is guided on a valve housing and a guide element, which necessitates a very precise fabrication with close tolerances, due to the addition of tolerance fields.

DETAILED DESCRIPTION OF THE PREFERRED EMBODIMENTS

Figure 1:
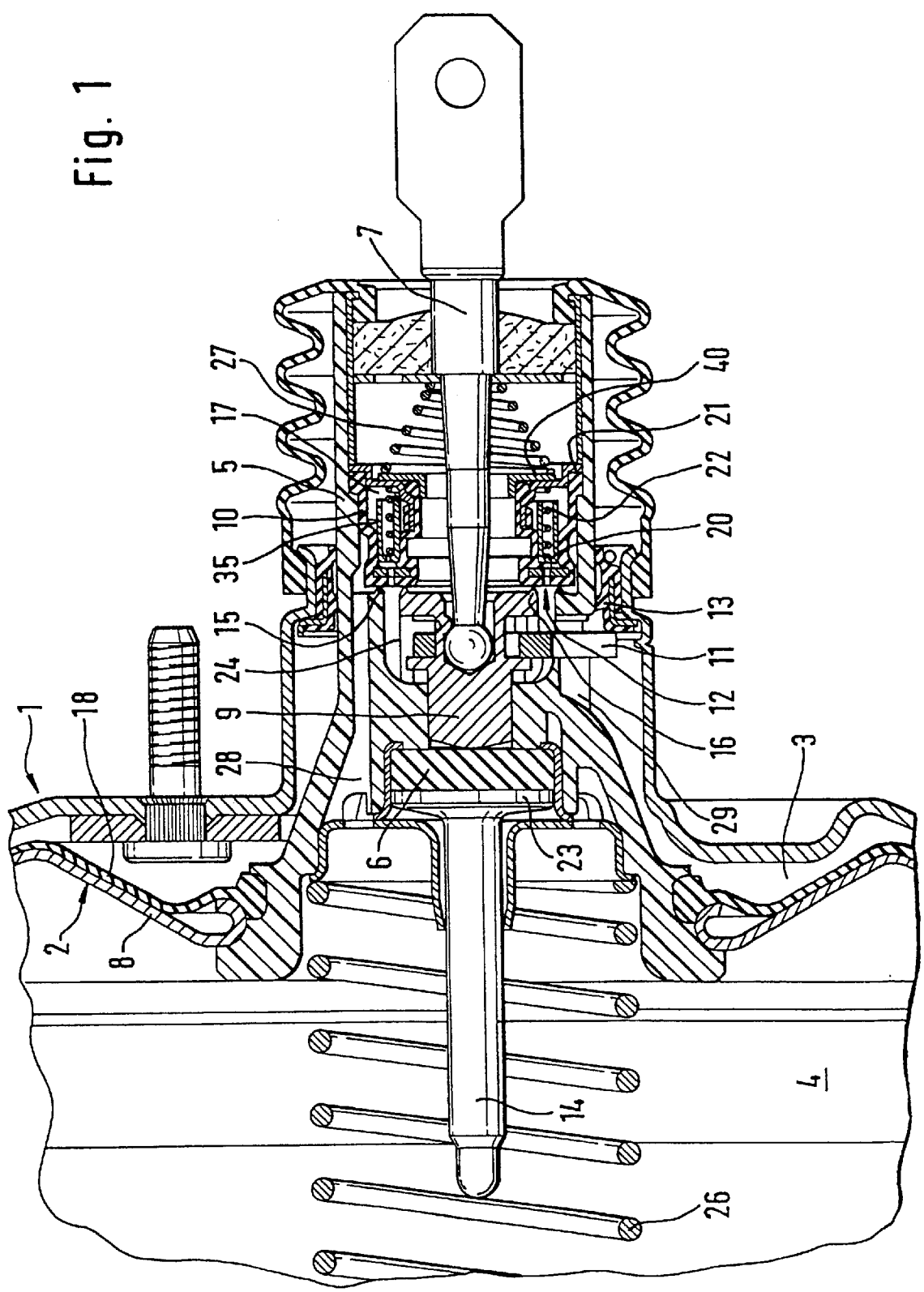
FIG. 1 is a longitudinal cross-sectional view, partly broken off, of a brake force booster of the state of the art.

The booster housing 1 of the brake force booster of the prior art, which is shown only schematically in FIG. 1, is subdivided by an axially movable wall 2 into a working chamber 3 and a vacuum chamber 4. The axially movable wall 2 is comprised of a sheet-metal deepdrawn diaphragm plate 8 and a flexible diaphragm 18 abutting thereon. Diaphragm 18 (not shown in detail) is a rolling diaphragm and produces a seal between the external periphery of the diaphragm plate 8 and the booster housing 1.

A control valve 12 which is operable by an actuating rod 7 is accommodated in a control housing 5 that is sealed and guided in the booster housing 1 and carries the movable wall 2. Control valve 12 is comprised of a first sealing seat 15 provided on the control housing 5, a second sealing seat 16 which is provided on a valve piston 9 connected to the actuating rod 7, and a valve member 10 which cooperates with both sealing seats 15, 16. Valve member 10 is urged against the valve seats 15, 16 by means of a valve spring 22 which is supported on a holding ring 21. The working chamber 3 is connectable to the vacuum chamber 4 by way of a channel 28 which extends laterally in the control housing 5.

By way of a rubber-elastic reaction disc 6 which frontally abuts on the control housing 5 and a push rod 14 having a head flange 23, the brake force is transmitted to an actuating piston of a non-illustrated master cylinder of the brake system which is fitted to the vacuum-side end of the brake force booster. The input force which is introduced on the actuating rod 7 is transmitted to the reaction disc 6 by means of the valve piston 9.

A resetting spring 26 (illustrated schematically in the drawing) which is supported on a flange (not shown) on the vacuum-side end wall of the booster housing 1 maintains the movable wall 2 in the initial position shown. Further, there is provision of a second compression spring 27 which is interposed between the actuating rod 7 and a prop ring 40 that abuts on the holding ring 21 and secures the valve member 10 on the holding ring 21, and the force of which ensures a bias of the valve piston 9 or of its valve seat 16 in relation to the valve member 10.

In order to connect the working chamber 3 to the atmosphere when the control valve 12 is actuated, a channel 29 which extends in a roughly radial direction is designed in the control housing 5. The return movement of the valve piston 9 at the end of a braking operation is limited by a transverse member 11 which, in the release position of the brake force booster shown in the drawing, bears against a sliding gasket 13 that guides and seals the control housing 5 in the booster housing 1.

Figure 2:
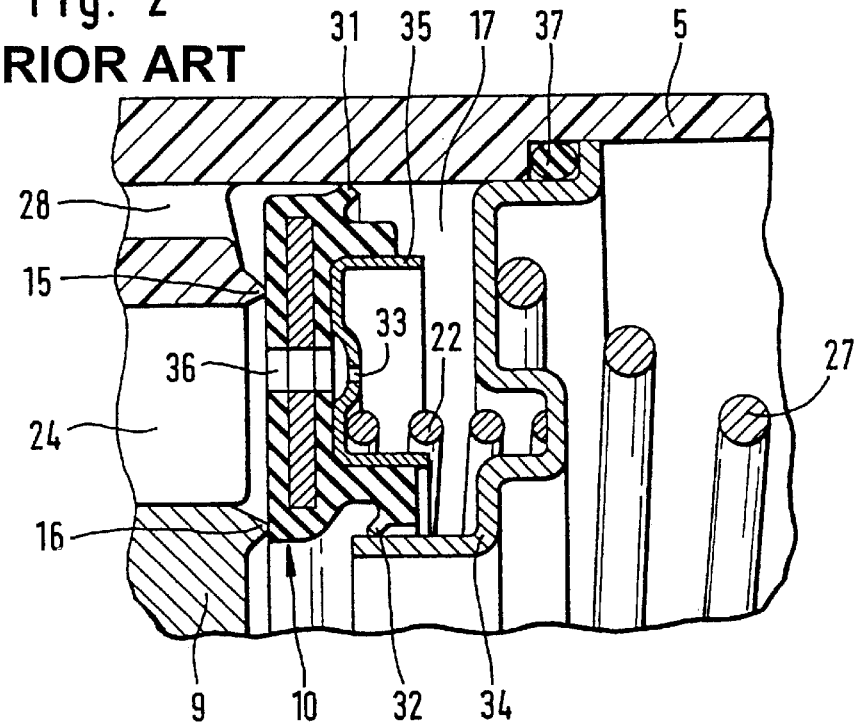
FIG. 2 is a greatly simplified enlarged view of a control assembly of a prior art brake force booster.

In the embodiment of FIG. 2 which shows the prior art in detail, the valve member is in the release position. The valve member 10 has an annular design and includes a radially outward first sealing lip 31 which sealingly abuts on the wall of the control housing 5, and a radially inward second sealing lip 32 which cooperates with a guide element 34 that defines the pneumatic (pressure-compensating) chamber 17. The guide element 34 which is sealed in relation to the control housing 5 by means of an O-ring 37 serves for the support of the piston-rod return spring 27, on the one hand, and for the support of the valve spring 22, on the other hand. Similar to FIG. 1, passages 36 in the valve member 10 and openings 33, which are provided opposite to passages 36 in a reinforcement ring 35 that reinforces the valve member 10 and has a U-shape in cross-section, ensure the connection between the pressure-compensating chamber 17 and the annular chamber 24 or the working chamber 3 (not shown).

Figure 3:
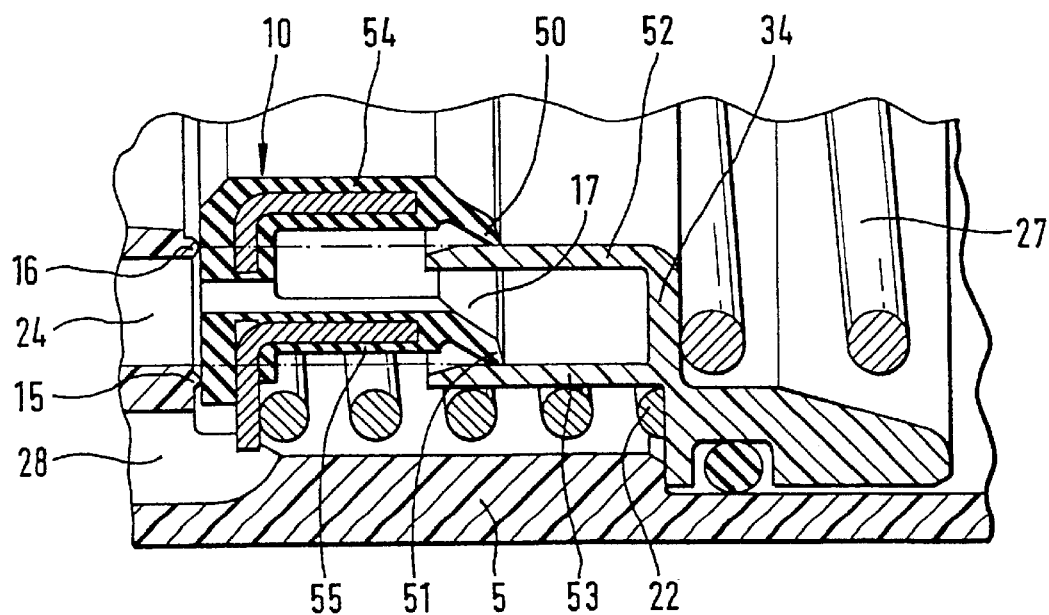
FIG. 3 is a view of a control assembly of a brake force booster of the present invention, in a cross-section as in FIG. 2.

Identical or corresponding components in FIG. 3 have been assigned the reference numerals of FIGS. 1 and 2 and will not be explained in detail. As is shown in FIG. 3, the valve member 10 has a radially inward sealing lip 50 and a radially outward sealing lip 51, and the two sealing lips are arranged on different diameters. Further, auxiliary broken lines in the drawing illustrate that each of the sealing lips 50, 51 in an axial direction is largely in alignment with respectively one of the two sealing seats 16, 15. Axially offset to the valve member 10, a guide element 34 with two concentrically arranged guiding sockets 52, 53 is associated with it, and respectively one of the sealing lips 50, 51 abuts on a contact surface on each of the guiding sockets 52, 53. For the purpose of a complete guiding of the valve member 10 on or, respectively, in the guide element 34, both components have a U-shaped cross-section, and the sealing lips 50, 51 are arranged on the ends of axially projecting legs or collars 54, 55. In detail, the radially outward sealing lip 51 is positioned between the two guiding sockets 52, 53 and acts upon the contact surface of the external guiding socket 53. Further, the radially inward sealing lip 50 acts upon the contact surface of its associated radially inward guiding socket 52. It is still to be noted that the two sealing lips 50, 51 project transversely in a radially outward direction in relation to the two legs 54, 55.

The arrangement of the sealing lips 50, 51 in relation to the valve seats is absolutely important for the pressure-compensating effect on the valve member 10 so that the effective pneumatic surface of chamber 17, which is influenced by the difference in diameter between the sealing lips 50, 51, in the direction of projection to the valve member 10 is basically in conformity with the pneumatic surface defined between the two sealing seats 15, 16 in the direction of projection to the valve piston 10.

The present invention is not limited to the brake force booster according to the embodiment shown. It is, for example, possible to furnish an independently actuated brake force booster, as it is used for the so-called brake assist system, with the claimed device without departing from the basic idea of this invention.

What is claimed is:

1. Brake force booster for automotive vehicles, comprising:

a booster housing having an interior space subdivided by a movable wall into a vacuum chamber and a working chamber, a control valve which controls a pressure differential that acts upon the movable wall and is accommodated in a control housing that carries the movable wall, the control valve including at least two concentrically arranged sealing seats and a valve member which defines in the control housing a pneumatic chamber that is acted upon by the pneumatic pressure that prevails in the working chamber wherein the valve member includes two sealing lips of different diameters which define the pneumatic chamber in the control housing, wherein the sealing lips generally align with the sealing seats in an axial direction so that the effective pneumatic surface of the chamber which is influenced by the difference in diameters is generally in conformity with the pneumatic surface defined between the two sealing seats.

2. Brake force booster as claimed in claim 1, further including a guide element having two concentric guiding sockets, wherein the guide element is associated with the valve member and with the sealing lips.

3. Brake force booster as claimed in claim 2, wherein the valve member with the sealing lips and the guide element with the guiding sockets have a U-shaped cross-section.

4. Brake force booster as claimed in claim 2, wherein one of said two sealing lips is arranged radially outward from the other sealing lip wherein the radially outward sealing lip is arranged between the two guiding sockets and abuts on a contact surface of the radially outward guiding socket.

5. Brake force booster as claimed in claim 2, wherein the radially inward sealing lip abuts a contact surface of guiding socket.

6. Brake force booster as claimed in claim 1, wherein the sealing lips are arranged on axially projecting legs of the valve member.

7. Brake force booster as claimed in claim 6, wherein both sealing lips project in a radially transverse outward direction with respect to the axially projecting legs of the valve member.

* * * * *

UNITED STATES PATENT AND TRADEMARK OFFICE
CERTIFICATE OF CORRECTION

PATENT NO.    : 6,367,364 B1
DATED         : April 9, 2002
INVENTOR(S)   : Horst Krämer It is certified that error appears in the above-identified patent and that said Letters Patent is hereby corrected as shown below:

Column 4,
Line 44, change "surface of guiding" to -- surface of a guiding --.

Signed and Sealed this

Third Day of December, 2002

JAMES E. ROGAN
*Director of the United States Patent and Trademark Office*